Sept. 2, 1969     L. WALZEL     3,464,686

CONVERTER TILT DRIVE

Filed Aug. 1, 1967

Inventor
LEOPOLD WALZEL

BY

McGlew & Toren
ATTORNEYS

United States Patent Office 3,464,686
Patented Sept. 2, 1969

3,464,686
CONVERTER TILT DRIVE
Leopold Walzel, Duisburg, Germany, assignor to Demag A.G., Duisburg, Germany
Filed Aug. 1, 1967, Ser. No. 657,585
Claims priority, application Germany, Aug. 26, 1966, D 50,956
Int. Cl. C21c *5/50;* F16h *37/06*
U.S. Cl. 266—36          6 Claims

ABSTRACT OF THE DISCLOSURE

A steel mill converter tilt drive includes two separate driving motors which are arranged between two converters in a manner such that each may be selectively connected to drive one or the other converter.

SUMMARY OF THE INVENTION

The invention relates in general to metallurgical converter construction and in particular to a new and useful tilt drive for a steel mill converter in which two driving motors are arranged between at least two converters for selective connection to drive one or the other of the converters.

The driving systems for tilting large converters in metallurgical plants are located directly adjacent the converter so that they are subject to severe thermal stresses. In particular, the mounting journal or pin for the converter, which is adapted to be connected through gearing or clutches to the driving motor of such drives, is subjected to severe bending stresses causing displacement of the parts and possible destruction of one or more driving elements. Clutches suitable to the purpose have been developed which are capable of absorbing such bending stresses. The part of the gearing ahead of the clutch, however, is still subjected to special stresses because no reliable devices have been provided for operating the gearing for many operating hours without any trouble developing. The reason for this is that the connecting parts are subjected to fatigue failure and manufacturing and installation imperfections which cannot be completely avoided. Practical experience has shown that premature wear will occur, at least in some cases. The social life of such driving systems and gearings is estimated to be between 10 and 15 years. However, considerable numbers of such gear systems do not obtain such a life span. In addition, there sometimes occur special circumstances which cause an accidental breakage of one of the driving elements. For example, the skull at the converter mount grows surprisingly fast and thick during the blasting process. When the vessel is tilted after freshening the crude iron bath, it becomes necessary to remove this skull. Removal of the skull at the converter mount is accomplished in part by striking the edge of the mount against the fixed stripper. This process proceeds normally when the control of the vessel motion is executed with sufficient care. However, it is not unusual for the operation to result in the failure of one or more gear teeth of the tilt drive. Damage of this nature necessarily involves the shut-down of the respective blasting station in order to dismantle the damaged section and to replace the component parts. Complete repairs can in some instances take as long as several days, and thus a great number of furnace charges will be lost. This, of course, results in the disruption of many other operations inside the steel mill.

In accordance with the present invention the above difficulties are overcome by providing a driving system which permits the shifting of the tilting drive from one motor and drive system to another in an easy and simple manner in order to provide a shut-down for one system which may require repairs, for example. In the preferred arrangement, the drive system includes at least two separate driving motors arranged between two converters. The motors may be selectively connected between two separate driving connections which are associated with each respective converter so that one driving system and its associated motor may be shut down for repairs and the other may be employed for selectively driving one or the other of the converters. The system is based upon the principle of arranging the drive between two or more converters so that the driving power may be concentrated between several converter blasting stations. Since all of the converters are not usually in operation simultaneously, if one gear fails, a single motor may be shifted selectively between one converter and the next adjacent converter until the repair of the other system. By disposing the drive units between the vessels, the area formerly used for a single drive may be practically utilized for two drives. This central location of the driving units between two converters permits an easier power installation and connection and the formation of a common access for servicing and transportation of any necessary replacement parts.

In a preferred arrangement, each driving system includes a driving motor with its associated low gearing connection terminating in an output shaft extending outwardly from each side which may be provided with an output gear for selectively connecting the adapted side to receiving gears which are carried on respective ones of two shafts. The respective shafts are connected to the journal supporting an associated converter by suitable gearing. The output gear thus may be oriented on one side of the output shaft to drive one converter, or on the opposite side of the shaft to drive another converter.

Accordingly it is an object of the invention to provide a metallurgical converter vessel tilting drive which includes two driving motors arranged to be selectively connected through gearing to a selected one of at least two converter vessels between which the driving connections are located.

A further object of the invention is to provide a metallurgical drive for a converter which permits the selective driving between a plurality of motors and a plurality of converter vessels.

A further object of the invention is to provide a metallurgical furnace tilting drive which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION

Figure 1:
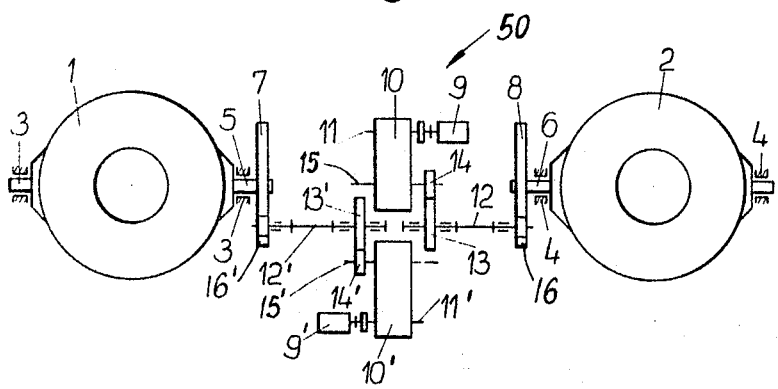
FIG. 1 is a schematic top plan view of a drive system for two converters constructed in accordance with the invention.

Referring to the drawings in particular, the invention embodied therein comprises a drive system generally designated 50 which is employed for servicing a plurality of converters, in this instance two converters, 1 and 2. The system 50, in accordance with the invention, is located between tilting pins 5 and 6 of the respective converters 1 and 2 which are supported in respective bearings 3, 3 and 4, 4. The tilting pins 5 and 6 are connected with their associated converters 1 and 2 in a manner such that rotation thereof will cause a rotation and tilting movement of its associated converter.

The drive system 50 includes two separate driving motors 9 and 9' which are connected through associated input shafts 11, 11' to a lower gear system or gear box 10, 10' respectively. A double-ended output shaft 15 and 15' respectively, extends outwardly from the associated gear boxes 10 and 10'. Respective gears 14, 14' may be mounted on selected ends of the double-ended output shafts 15, 15', in a position so that it may engage either a gear 13 on a shaft 12 or a gear 13' on a shaft 12'. The shaft 12 is provided with a driving gear 16 which engages a gear 8 to rotate the tilt journal 6 and thus tilt the converter 2. The gear 12' is provided with a gear 16' which engages with a gear 7 secured to the tilt journal 5 to rotate the converter 1.

Figure 2:
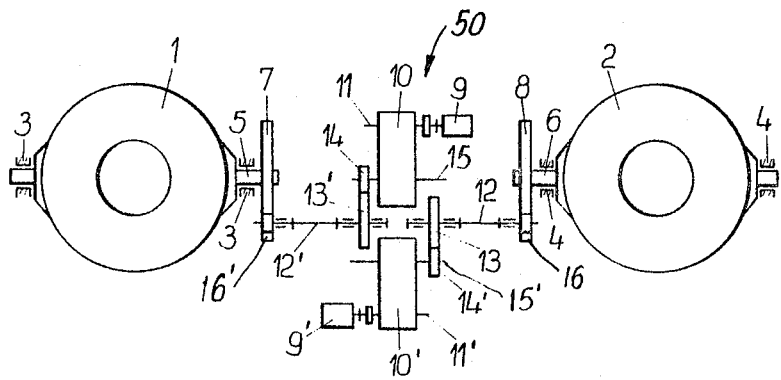
FIG. 2 is a view similar to FIG. 1 in which the separate driving motors are connected to opposite converters from that indicated in FIG. 1.

In FIG. 2, the gear 14 is shifted to the other end of the double-ended output shaft 15 in a position to drive the gear 13' and thus actuation of the motor 9 will cause tilting of converter 1. The gear 14' is located on the opposite end of its associated double-ended shaft 15, and thus actuation of the motor 9' will cause a tilting movement of the converter 2.

In the embodiment of the invention indicated in FIGS. 1 and 2, gear driving elements are shown, but it should be appreciated that clutches, hydraulic drives and axial piston drives may be substituted for the driving motors and connecting systems.

While a specific embodiment of the invention has been shown and described in detail to illustrate the application of the inventive principles, it will be understood that the invention may be embodied otherwise without departing from such principles.

What is claimed is:

1. A metallurgical converter tilt drive system comprising at least two metallurgical converters each having a tilt axis journal, means mounting said journals for rotation to permit tilting of said converters, at least two motors located between said converters, and means for selectively and independently connecting said motors to an associated journal of each converter for rotating said journals.

2. A metallurgical converter tilt drive system according to claim 1, wherein said means for selectively and independently connecting said motors to an associated journal includes a first driving shaft associated with one of said converters and a second driving shaft associated with the other of said converters, and adjustable gear means connected between the associated motors selectively engageable with said first and second shafts.

3. A metallurgical converter tilt drive system according to claim 1, including a first rotatable shaft geared to said journal of one of said converters, a second rotatable shaft geared to said journal of the other of said rotatable converters, an output shaft associated with and driven by respective ones of each of said motors and gear means engageable with said output shaft and for selective driving engagement with one of said first and second shafts.

4. A metallurgical converter tilt drive system according to claim 3, including a drive gear on each of said first and second shafts and wherein said gear means comprises a gear which may be oriented at a selected location along said output shaft for engagement with a selected one of said drive gears on a respective one of said first and said second shafts.

5. A metallurgical converter tilt drive system according to claim 1, including a driven gear affixed to each of said journals, said means for selectively and independently connecting said motors to an associated journal including a first shaft having first pinion gear engaged with said driven gear of one of said journals and a second shaft having a second pinion gear in driving engagement with said driven gear of the other of said journals, and gear means located between said associated motors and said first and second shafts for selectively connecting said motors to one of said first and second shafts.

6. A metallurgical converter tilt drive system according to claim 5, wherein said gear means comprises an output shaft driven by each associated motors and an output gear carried on said output shaft and shiftable along said shaft for selectively engaging said output shaft with said first and second shafts.

References Cited

UNITED STATES PATENTS

| 2,095,965 | 10/1937 | Brassert | 266—13 X |
| 2,483,017 | 9/1949 | McFeaters. | |
| 2,541,625 | 2/1951 | Webster. | |
| 2,683,384 | 7/1954 | Rogers. | |
| 3,325,160 | 6/1967 | Eklund. | |
| 3,334,884 | 8/1967 | Suzuki et al. | 266—34 |

J. SPENCER OVERHOLSER, Primary Examiner

R. S. ANNEAR, Assistant Examiner

U.S. Cl. X.R.

74—661, 665; 266—13